Patented Apr. 18, 1944

2,346,789

UNITED STATES PATENT OFFICE 2,346,789

WELL LOGGING

Edwin E. Roper, Tulsa, Okla., assignor to Stanolind Oil and Gas Company, Tulsa, Okla., a corporation of Delaware No Drawing. Application June 15, 1942, Serial No. 447,175

6 Claims. (Cl. 250—83.6)

This invention pertains to the art of radioactive well logging and more particularly to a method of eliminating certain undesired effects therefrom.

At the present time the radioactivity of the formations forming the boundaries of a well are ascertained by lowering a radioactivity measuring device into the well and making a log or graph of the response of this instrument to the penetrating or gamma radiations emanating from the formations. For most purposes the resultant well-log in terms of response versus depth is sufficient. However, there are certain cases in which the method just outlined will not yield satisfactory results.

I have determined that of the three groups of elements possessing radioactive properties, it is only the concentration of those in the radium and thorium groups that produce useful information in the interpretation of well logs. This is especially true when one wishes to obtain information in regard to the position of oil bearing formations. It is known that radium decomposes to produce the gaseous element, radon. Radon is itself radioactive and additionally possesses the property of being relatively highly dissolved by petroleum. Accordingly, high concentrations of radon are to be regarded as indicative of the possibility of the presence of a petroleum deposit. Again both the radium and the thorium compounds are quite heavy so that in the process of decomposition of any sedimentary stratum there is a tendency for them to settle near the lower boundary of that stratum. On the other hand, the third radioactive group, namely, radioactive potassium, is present, as far as is known, in all potassium bearing formations which includes the majority of formations found in the earth. It is, for example, one of the major constituents of clays and shales. Although the radioactive potassium isotope, $K^{40}$, occurs in only extremely small concentrations, relative to the total amount of the non-radioactive potassium isotopes $K^{39}$ and $K^{41}$, nevertheless the total amount of the potassium isotopes, i. e., total potassium, is so great compared to the concentration of the radium or the thorium compounds that I have found the total intensity of radioactive emanations from potassium in certain cases to be of the same order of magnitude as that from the radium and thorium compounds. It is therefore apparent that it is desirable to eliminate the effect of radioactive potassium from the radioactive well logs since the radium and thorium compounds give rise to radon while $K^{40}$ during its radioactive decomposition gives off only gamma rays.

It is an object of this invention to provide a method for eliminating the effect of potassium on radioactive well logs. Another object of this invention is to provide a method for determining the existence of oil bearing formations in a well by making a radioactivity well log and correcting the log for the presence of radioactive potassium in the formations.

To a very good approximation the ratio of the concentration of radioactive potassium to total potassium in rocks is a constant. Therefore, I accomplish the objects of this invention by measuring the penetrating or gamma radiation from the earth formations penetrated by a well at a plurality of points in a zone in the well and determining the relative amounts of potassium in the same formational zone and preferably at approximately the same points, from which the relative effect of the radioactive potassium upon the radioactivity log can be determined. Thus, for example, if a log of the total radioactivity shows a fairly constant value of, say, eleven units in a formation having a relative potassium concentration of one, and at a different depth in the well, the log increases to twenty one units, whereas the potassium concentration of the formation has changed to a value of eleven, it is apparent that there has been effectively no change in the radium-thorium radioactive content of the formations. On the other hand, if the potassium concentration has remained constant, it is apparent that the actual radioactivity of the radium-thorium group has increased two to one, thus labelling the formation as a possible source of oil or perhaps the boundary of a formation.

I prefer to determine the potassium content of the formations by obtaining samples of the formations either by means of ordinary coring, side wall coring, or by obtaining samples of the cuttings from the formations as they are washed out by the drilling fluid. In all such cases it is necessary to correlate the samples obtained with the depth from which they were taken and the techniques for doing this are well-known in the art. An analysis is then made by means known to one versed in the art for the total potassium concentration of the sample; for example, a spectographic method of analysis is one method of determining this concentration. The concentrations of the potassium content of the formations can then be plotted on the radioactivity log. A more preferable technique for determining the effect of various concentrations of $K^{40}$ on the log is to make an artificial stratum of, for example, four feet in diameter and ten feet long with a hole in the center of approximately the diameter of the well bore, out of material containing relatively no radioactive compounds with the exception of potassium, determine the concentration of the potassium in the sample in the artificial stratum and place the radioactive sensitive measuring device in the hole, whereby the response of this instrument to the concentration of potassium in the artificial stratum can be determined. This response multiplied by the relative concentration of the potassium in the well formations to that of the artificial stratum is then used to produce a log of the radioactivity due solely to radioactive potassium. The readings on this log can be subtracted from the readings on the radio-activity log in order to obtain a radioactivity log of the radium-thorium compounds alone.

In cases of extremely high potassium concentration, for example in logging wells penetrating potash beds, it is desirable to refine the above described method by determining with a mass spectrograph the actual concentration of the radioactive potassium isotope relative to the total potassium content of the sample.

Another alternative of the method embodying my invention includes determining the response of the well-logging radioactivity sensitive measuring device to a known amount of gamma radiation, as for example, exposing said device to a known amount of a radium salt a known distance from the device, make a total radioactivity survey of the well using the calibrated device, obtain samples of the formations forming the walls of the well in the zone of investigation, analyze these samples for total potassium (i. e. all isotopic varieties), and determine from these concentrations of total potassium the ratio of radioactive potassium $K^{40}$ to total potassium, the amount of $K^{40}$ present in each sample, from which the amount of gamma radiation emanated from the walls of the well can be found and used to modify the total radioactivity log.

I claim:

1. A method of determining information on the extent and contents of earth formations penetrated by a well including the steps of measuring the penetrating radiation from said formations at a plurality of points in a zone in said well, determining the response of the apparatus used for measuring said penetrating radiation to varying amounts of potassium, and determining the relative amounts of potassium in said formation in said zone, whereby said measurements of penetrating radiation can be modified in order to eliminate the effect on said measurements of radioactive potassium.

2. A method of locating the existence of oil-bearing formations penetrated by a well including the steps of measuring as a function of depth within a zone of investigation in said well the penetrating or gamma radiation from the formations adjacent said well, determining the response of the apparatus used for measuring said penetrating radiation to formations containing varying amounts of potassium, obtaining samples of said adjacent formations at a number of points in said zone, determining the relative amounts of potassium in said samples and preparing a graph of said radioactive measurements and said relative amounts of potassium, whereby said measurements of penetrating radiation can be corrected to eliminate the effect on said measurements of radioactive potassium.

3. In radioactivity well logging wherein a radioactivity-sensitive measuring device is lowered into a well and a radioactivity well log made, a method of determining concentrations of the radium and thorium radioactive minerals in said well comprising the steps of determining the response of said measuring device to varying amounts of potassium, obtaining samples of formations from said well at known depths, analyzing said samples for the relative amounts of potassium, and determining therefrom the effect of said amounts of potassium in said formations on said measuring device whereby said radioactivity well log may be compensated for radioactive potassium in said formations by subtracting the effect of said amounts of potassium on said measuring device from the response of said measuring device at the depths at which said samples were obtained.

4. In radioactivity well logging wherein a radioactivity-sensitive measuring device is lowered into a well and a radioactivity well log made, a method of determining concentrations of the radium and thorium radioactive minerals in said well comprising the steps of determining the response of said measuring device to a known amount of gamma radiation, obtaining samples of formations from said well at known depths, analyzing said samples for the total potassium content of each of said samples, and determining therefrom the radioactivity in said well due to the potassium content of the walls thereof, whereby the response of said measuring device to said potassium can be obtained and used to modify said well log.

5. In radioactivity well logging wherein a radioactivity-sensitive measuring device is lowered into a well and a radioactivity well log made, a method of determining concentrations of the radium and thorium radioactive minerals in said well comprising the steps of determining the response of said measuring device to a known amount of gamma radiation, obtaining samples of formations from said well at known depths, analyzing said samples for the isotopic abundance ratio of the potassium content of each of said samples, and determining therefrom the radioactivity in said well due to the potassium content of the walls thereof, whereby the response of said measuring device to said potassium can be obtained and used to modify said well log.

6. A method according to claim 3 in which said analysis is carried out by the spectographic method, and in which said samples are drill cuttings.

EDWIN E. ROPER.